United States Patent
Miyamoto et al.

(10) Patent No.: US 10,385,195 B2
(45) Date of Patent: Aug. 20, 2019

(54) RESIN COMPOSITION FOR RESIN MOLDING, AND RESIN MOLDING

(71) Applicant: FUJI XEROX CO., LTD., Tokyo (JP)

(72) Inventors: Tsuyoshi Miyamoto, Minamiashigara (JP); Hiroyuki Moriya, Minamiashigara (JP); Masayuki Okoshi, Minamiashigara (JP)

(73) Assignee: FUJI XEROX CO., LTD., Tokyo (JP)

( * ) Notice: Subject to any disclaimer, the term of this patent is extended or adjusted under 35 U.S.C. 154(b) by 5 days.

(21) Appl. No.: 15/663,994

(22) Filed: Jul. 31, 2017

(65) Prior Publication Data

US 2018/0273738 A1  Sep. 27, 2018

(30) Foreign Application Priority Data

Mar. 24, 2017  (JP) .................... 2017-058683

(51) Int. Cl.
| | |
|---|---|
| *C08J 5/04* | (2006.01) |
| *C08K 7/02* | (2006.01) |
| *C08K 7/06* | (2006.01) |
| *C08L 23/06* | (2006.01) |
| *C08L 23/08* | (2006.01) |
| *C08L 23/12* | (2006.01) |
| *C08L 51/06* | (2006.01) |
| *C08L 77/00* | (2006.01) |

(52) U.S. Cl.
CPC .............. *C08L 23/12* (2013.01); *C08J 5/042* (2013.01); *C08J 5/046* (2013.01); *C08L 23/06* (2013.01); *C08L 23/0853* (2013.01); *C08J 2323/06* (2013.01); *C08J 2323/08* (2013.01); *C08J 2323/12* (2013.01); *C08J 2451/06* (2013.01); *C08J 2477/00* (2013.01); *C08L 2205/02* (2013.01); *C08L 2205/03* (2013.01); *C08L 2205/035* (2013.01); *C08L 2205/08* (2013.01); *C08L 2205/16* (2013.01)

(58) Field of Classification Search
None
See application file for complete search history.

(56) References Cited

U.S. PATENT DOCUMENTS

| 5,883,186 A | * | 3/1999 | Gottschalk | .............. C08L 23/10 |
|---|---|---|---|---|
| | | | | 525/178 |
| 2003/0092814 A1 | | 5/2003 | Borgner et al. | |
| 2009/0286926 A1 | | 11/2009 | Yanagisawa et al. | |
| 2011/0260096 A1 | | 10/2011 | Atarashi | |
| 2015/0291789 A1 | * | 10/2015 | Hirata | ..................... C08J 5/047 |
| | | | | 523/468 |

FOREIGN PATENT DOCUMENTS

| EP | 2937377 A1 | 10/2015 |
|---|---|---|
| JP | 2000-071245 A | 3/2000 |
| JP | 2003-528956 A | 9/2003 |
| JP | 2014-181307 A | 9/2014 |
| WO | 2014/076353 A1 | 5/2014 |

OTHER PUBLICATIONS

Feb. 13, 2018 Extended European Search Report issued in Patent Application No. 17186898.7.

* cited by examiner

*Primary Examiner* — Ana L. Woodward
(74) *Attorney, Agent, or Firm* — Oliff PLC

(57) ABSTRACT

A resin composition for resin moldings comprises: a first resin composition containing a first polyolefin, a polyamide, carbon fibers having an average fiber length of 0.1 mm to 1 mm and a carboxylic anhydride-modified polyolefin as a compatibilizer; and a second resin composition containing a second polyolefin and organic fibers having an average fiber length of 1 mm to 20 mm, wherein, taking the total contents of the first polyolefin and the second polyolefin as 100 parts by mass, a content of the polyamide accounts for 1 part by mass to 50 parts by mass, a content of the carbon fiber accounts for 1 part by mass to 50 parts by mass, a content of the organic fibers accounts for 1 part by mass to 20 part by mass, and a content of the compatibilizer accounts for 1 part by mass to 10 parts by mass.

11 Claims, 1 Drawing Sheet

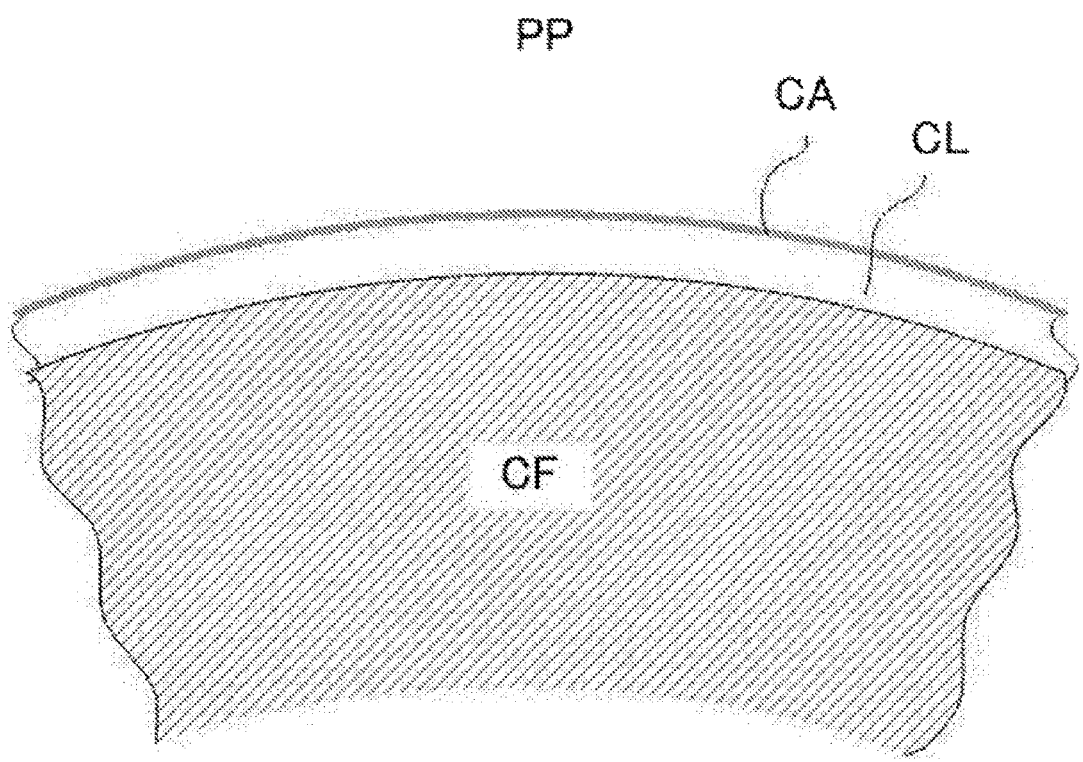

RESIN COMPOSITION FOR RESIN MOLDING, AND RESIN MOLDING

CROSS-REFERENCE TO RELATED APPLICATIONS

This application is based on and claims a priority under 35 USC 119 from Japanese Patent Application No. 2017-058683 filed on Mar. 24, 2017.

BACKGROUND

Technical Field

The present invention relates to a resin composition for a resin molding and to a resin molding.

Related Art

Up to now various kinds of resin compositions have been offered and put to a wide variety of uses.

Resin compositions containing polyolefin in particular have been used e.g. for not only various kinds of components and cabinets of household electric appliances and automobiles but also parts such as cabinets of office instruments and electrical-electronic instruments.

SUMMARY

According to an aspect of the invention, a resin composition for resin moldings includes:

a first resin composition containing a first polyolefin, a polyamide, carbon fibers having an average fiber length of 0.1 mm to 1 mm and a carboxylic anhydride-modified polyolefin as a compatibilizer; and a second resin composition containing a second polyolefin and organic fibers having an average fiber length of 1 mm to 20 mm, wherein of the whole quantity of the resin composition for resin moldings, taking the total contents of the first polyolefin and the second polyolefin as 100 parts by mass, a content of the polyamide accounts for 1 part by mass to 50 parts by mass, a content of the carbon fiber accounts for 1 part by mass to 50 parts by mass, a content of the organic fibers accounts for 1 part by mass to 20 part by mass, and a content of the compatibilizer accounts for 1 part by mass to 10 parts by mass.

BRIEF DESCRIPTION OF THE DRAWINGS

Exemplary embodiment(s) of the present invention will be described in detail based on the following figures, wherein:

FIG. 1 is a schematic diagram for illustrating an example of the main portions of resin moldings relating to embodiments of the invention.

DETAILED DESCRIPTION

Examples of resin compositions and resin moldings according to the invention are described below.
(Resin Composition for Resin Molding)

A resin composition which relates to an embodiment of the invention and is used for resin moldings (hereafter referred simply to as "a resin composition" in some cases) includes a first resin composition containing a first polyolefin, a polyamide, carbon fibers having an average fiber length of 0.1 mm to 1 mm and a carboxylic anhydride-modified polyolefin as a compatibilizer and a second resin composition containing a second polyolefin and organic fibers having an average fiber length in a range of 1 mm to 20 mm. Additionally, of the total quantity by mass of the resin composition for resin moldings, taking the total for the first polyolefin content and the second polyolefin content as 100 parts by mass, the polyamide content accounts for 1 part by mass to 50 parts by mass, the carbon fiber content accounts for 1 part by mass to 50 parts by mass, the organic fiber content accounts for 1 part by mass to 20 parts by mass and the compatibilizer content account for 1 part by mass to 10 parts by mass.

In other words, the resin composition relating to an embodiment of the invention includes a first resin composition and a second resin composition.

The first resin composition contains a first polyolefin, a polyamide, first carbon fibers having an average fiber length of 0.1 mm to 1 mm (hereafter referred simply to as "first carbon fibers" in some cases) and a carboxylic anhydride-modified polyolefin as a compatibilizer.

The second resin composition contains a second polyolefin and second carbon fibers having an average fiber length of 6 mm to 20 mm (hereafter referred simply to as "second carbon fibers" in some cases).

Moreover, of the whole quantity of the resin composition, taking the total for a first polyolefin content and a second polyolefin content as 100 parts by mass, a polyamide content accounts for 1 part by mass to 50 parts by mass, the total for a first carbon fiber content and a second carbon fiber content accounts for 1 part by mass to 50 parts by mass and a content of carboxylic anhydride-modified polyolefin as a compatibilizer (hereafter referred simply to as "compatibilizer content" in some cases) accounts for 1 part by mass to 10 parts by mass.

In recent years, resin compositions each containing a polyolefin resin as a base material (matrix) and reinforcing fibers have been used for the purpose of obtaining resin moldings superior in mechanical strength.

In such resin compositions, when affinity between the reinforcing fibers and the polyolefin is low, spaces develop at the interface between these ingredients, and there may be cases where the spaces cause a reduction in adhesion at the interface.

When a resin composition contains as reinforcing fibers carbon fibers in particular, though the resin composition is required to ensure high mechanical strengths, notably a high bending elasticity modulus, as compared with a resin composition containing glass fibers or the like, polar groups contributing adhesion between the reinforcing fibers and the polyolefin, such as hydroxyl groups and carboxyl groups, present on the carbon fiber surfaces are small in number as compared with those present on the glass fiber surfaces, and therefore adhesion at carbon fiber-polyolefin interfaces becomes low. As a result, the mechanical strengths, notably a bending elasticity modulus, is hard to increase, considering how much the carbon fibers are mixed. When an impact is given repeatedly in particular, parting at the carbon fiber-polyolefin interfaces is apt to progress, and hence there develops a tendency to reduce mechanical strengths, notably a bending elasticity modulus, to a large degree.

As a cause for this tendency, it is presumed that carbon fibers are rigid as compared with glass fibers and other fibrous reinforcing agents and resist bending distortion when a bending load is imposed thereon, and hence they part from polyolefin surfaces.

With this being the situation, by molding a resin composition containing e.g. 4 ingredients, a polyolefin, carbon fibers, a polyamide and a compatibilizer, the resin molding obtained comes to have excellent mechanical strengths, notably in point of bending elasticity modulus.

In a resin composition containing a polyolefin, carbon fibers, a polyamide and a compatibilizer, when the carbon fibers in the resin composition include only short fibers (having e.g. an average fiber length of 1 mm or below), there may be cases where resin moldings made from such a resin composition suffer reduction in impact resistance.

For instance, in a resin composition containing carbon fibers, because of their rigidity, the carbon fibers are apt to suffer breakage under a mechanical load imposed during the process of melt-kneading carbon fibers and a polyolefin. As a result, the carbon fibers in the resin composition are apt to be reduced in fiber length (e.g. so as to have an average fiber length of 1 mm or below).

Thus, as to the composition containing a polyolefin, carbon fibers, a polyamide and a compatibilizer, it has been learned that a resin molding formed from the resin composition whose carbon fibers are only carbon fibers changed into short fibers by a mechanical load imposed during the process of melt-kneading the carbon fibers and the polyolefin, though inhibited from reduction in its bending elasticity modulus, has a tendency to be susceptible to reduction in impact resistance.

This phenomenon is considered as follows. Because the carbon fibers in a resin molding are changed into those having short lengths, entanglement of carbon fibers is presumed to be limited in the resin molding. Therefore it is presumed that, when an impact force is imposed on the resin molding, the impact force is difficult to diffuse through the interior of the resin molding to result in breakage of the resin molding.

In contrast, the resin composition relating to an embodiment of the invention has the constitution as mentioned above, and thereby resin moldings obtained therefrom are improved in impact resistance. A reason for this improvement remains uncertain, but they are considered as follows.

The resin composition relating to this embodiment contains carbon fibers having an average fiber length of 0.1 mm to 1 mm in the first resin composition and organic fibers having an average fiber length of 1 mm to 20 mm in the second resin composition. Organic fibers resist breakage and cutting because of their high elasticity as compared with carbon fibers. As a result, a resin molding formed using this resin composition contains organic fibers long in fiber length in addition to carbon fibers having shortened fiber lengths. Specifically, the resin molding contains e.g. carbon fibers having an average fiber length in a range of 0.1 mm to 1 mm and organic fibers having an average fiber length in a range of 1 mm to 20 mm. And the resin molding is in a state that the percentage of the number of fibers from 1 mm to 20 mm in fiber length to the total for the number of carbon fibers and the number of organic fibers is from 1% to 20%.

Under this state, even when impact force is applied on the resin molding, the impact force is thought to be easy to diffuse into the interior of the resin molding. It is therefore presumed that the resin molding formed using the resin composition having the foregoing constitution is improved in impact resisting strength.

As mentioned above, the resin composition relating to this embodiment allows, in a resin molding formed therefrom, presence of carbon fibers having undergone fiber-length shortening and carbon fibers partially including long fibers, and therefore it is presumed that the resin molding improved in impact resisting strength is obtained.

Herein, a resin molding obtained using the resin composition relating to an embodiment of the invention is also inhibited from receiving reduction in bending elasticity modulus. Although an action bringing about such an effect remains unclear, it is thought as follows.

On the occasion of producing a resin molding from the resin composition which relates to an embodiment of the invention and includes the first resin composition and the second resin composition, the resin composition is subjected to hot-melt mixing, and thereby the polyolefin as a matrix and the compatibilizer are molten together, and besides the polyamide becomes compatible with the compatibilizer through a portion of the interior of compatibilizer molecules and amide or imide bonds present in polyamide molecules, resulting in dispersion into the resin composition.

By the way, the term polyamide as used in this specification is intended to include not only resins having amide bonds in their individual main chains but also resins having both amide bonds and imide bonds in their individual main chains (referred to as the so-called polyamide imide).

In the state described above, when polyamide molecules come into contact with carbon fibers (including the first carbon fibers and the second carbon fibers), amide bonds or imide bonds present in large numbers along the molecular chains of polyamide and polar groups present in small numbers on carbon fiber surfaces are physically coupled together at multiple sites by dint of affinity (gravitation and hydrogen bonding). In addition, because not only compatibility of polyolefin with carbon fiber but also affinity of polyolefin for carbon fiber is generally low, repulsive force is created between polyolefin and polyamide as well as between polyolefin and carbon fiber, and thereby frequency of contact between polyamide and carbon fiber is increased, resulting in formation of domains of carbon fiber-polyamide composites in the polyolefin matrix. Consequently, the amount and area of polyamide bonded to carbon fibers are increased. Thus a covering layer of polyamide is formed around the periphery of carbon fiber (see FIG. 1). By the way, PP, CF and CL in FIG. 1 stand for polyolefin, carbon fiber and covering layer, respectively.

Further, the polyamide forming a covering layer chemically reacts with some of reactive groups in compatibilizer molecules, and electrostatic interactions occur between polar groups in these ingredients, and thereby the polyamide comes to have compatibility with the compatibilizer, and besides the compatibilizer is also compatible with polyolefin. Thus an equilibrium state is created between gravitational and repulsive forces to result in formation of a polyamide covering layer in a thin and uniform state. Because affinity of carboxyl groups present on the carbon fiber surfaces for amide bonds or imide bonds present in polyamide molecules is especially high, it is presumed that a covering layer of polyamide is more likely to be formed around the peripheries of carbon fibers, and the covering layer formed is thin and superior in uniformity.

In addition, the covering layer preferably covers all over the carbon fiber surface, but an uncovered portion may be present on the carbon fiber surface.

As mentioned above, the resin composition relating to an embodiment of the invention allows improvement in adhesion of the carbon fiber-polyolefin interface. Consequently, it is considered that resin moldings obtained from the resin composition relating to an embodiment of the invention is superior in mechanical strengths, notably in bending elasticity modulus.

As to the resin composition relating to an embodiment of the invention and including the first resin composition and the second resin composition and resin moldings obtained from such a resin composition, a covering layer of polyamide is formed around the peripheries of carbon fibers through the hot-melt kneading during the preparation for the first resin composition (in the form of e.g. pellets) and injection molding of the resin composition, and the covering layer formed preferably has a structure from 5 nm to 700 nm in thickness.

In the resin composition relating to an embodiment of the invention, the covering layer of polyamide is from 5 nm to 700 nm in thickness, and from the viewpoint of further improving the bending elasticity modulus, the thickness thereof is preferably from 10 nm to 650 nm. The covering layer thickness of 5 nm or above (notably 10 nm or above) allows improvement in bending elasticity modulus, while the covering layer thickness of 700 nm or below makes it possible to inhibit the interface between carbon fiber and polyolefin through the medium of polyamide from becoming fragile, thereby controlling reduction in bending elasticity modulus.

The thickness of the covering layer is a value determined by the following method. A subject of measurement is ruptured in liquid nitrogen, and a cross section thereof is observed an electron microscope (VE-9800, made by KEYENCE CORPORATION). On the cross section, thickness measurements are made at 100 points of covering layers covering around the peripheries of carbon fibers, and the average of these measurement values is calculated.

By the way, checking of the covering layers is carried out by the cross section observation mentioned above.

Additionally, the first resin composition included in the resin composition relating to an embodiment of the invention and a resin molding molded from the resin composition relating to an embodiment of the invention and including the first resin composition and the second resin composition have structure that the compatibilizer performs partial compatibilization between the covering layer and the polyolefin.

To be specific, it is appropriate that there be an intervening layer of compatibilizer e.g. between the polyamide covering layer and the polyolefin as a matrix (see FIG. 1). In other words, it is appropriate that a layer of the compatibilizer be formed on the surface of the covering layer and the covering layer be adjacent to the polyolefin through the layer of the compatibilizer. The layer of the compatibilizer is formed in a smaller thickness than the covering layer, and the adhesion (bonding) of the covering layer to the polyolefin is enhanced by the medium of the compatibilizer layer, and thereby it becomes easy to obtain a resin molding superior in mechanical strengths, notably in bending elasticity modulus. By the way, PP, CF, CL and CA in FIG. 1 stand for polyolefin, carbon fiber, covering layer and compatibilizer, respectively.

It is especially appropriate that the compatibilizer layer be present between the covering layer and the polyolefin in a state of bonding to the covering layer (through hydrogen bonds and covalent bonds formed by reaction between functional groups of the compatibilizer and the polyamide) and being compatible with the polyolefin. Such a constitution is easy to realize by adopting a compatibilizer which has e.g. the same structure as the polyolefin matrix or a structure allowing compatibility with the polyolefin, and besides which contains in a portion of its molecule such a moiety as to react with the above-cited functional groups of the polyamide.

More specifically, in the case of adopting e.g. a polyolefin, a polyamide and a maleic anhydride-modified polyolefin as a compatibilizer, it is appropriate that a layer of the maleic anhydride-modified polyolefin (a layer of the compatibilizer) be present in a state that the carboxyl groups formed by ring-opening of maleic anhydride moieties react with amine residues of the polyamide layer (covering layer) to bond these layers together and compatibilize such polyolefin moieties and the polyolefin.

Now, a method for checking the presence of a compatibilizer layer between the covering layer and the polyolefin is as follows.

An infrared microspectroscopic analyzer (IRT-5200, made by JASCO Corporation) is used as an analysis device. For example, a sliced piece is cut from a resin molding which includes polypropylene (PP) as a polyolefin, PA66 as a polyamide and maleic anhydride-modified polyolefin (MA-PP) as a modified polyolefin, and a cross section thereof is observed. IR mapping of covering layer portions around the cross sections of carbon fibers is carried out, thereby checking on covering layer-maleic anhydride of compatibilizer layer origin (1,820 $cm^{-1}$ to 1,750 $cm^{-1}$). By doing so, the presence of a compatibilizer layer between the covering layer and the polyolefin can be ascertained. More specifically, when reaction occurs between MA-PP and PA66, cyclic maleated portion of MA-PP undergoes ring opening, and thereby chemical bonding of the amine residues of PA66 takes place to reduce the cyclic maleated portion. Thus the presence of a compatibilizer layer (bonding layer) between the covering layer and the polyolefin can be ascertained.

(First Resin Composition and Second Resin Composition)

The resin composition relating to an embodiment of the invention, as mentioned above, has the first resin composition containing a first polyolefin, a polyamide, first carbon fibers and a compatibilizer, and besides it has the second resin composition containing a second polyolefin and second carbon fibers.

Additionally, it is appropriate that each of the first resin composition and the second resin composition be a non-crosslinked resin composition.

Herein, the second resin composition may consist of two ingredients, a second polyolefin and second carbon fibers, or it may contain, in addition to these two ingredients, at least either a second polyamide or a carboxylic anhydride-modified polyolefin as a second compatibilizer.

In the resin composition relating to an embodiment of the invention, the ratio (by mass) between the first resin composition and the second resin composition has no particular limits. The ratio between these two resin compositions may be determined so that, taking the total content of the first polyolefin and the second polyolefin as 100 parts by mass, referred to the whole quantity of the resin composition, the polyamide content falls within a range of 1 part by mass to 50 parts by mass, the total content of the first carbon fibers and the second carbon fibers falls within a range of 1 part by mass to 50 parts by mass and the compatibilizer content falls within a range of 1 part by mass to 10 parts by mass.

As to the ratio between the first resin composition content and the second resin composition content, depending on the ingredients of the first resin composition and those of the second resin compositions, when the first resin composition content of the whole resin composition is symbolized by W1 and the second resin composition content of the whole resin composition is symbolized by W2, the W1/W2 ratio by mass is e.g. W1/W2=1/99 to 99/1 (preferably from 10/90 to 90/10).

In point of improvement in impact resistance of a resin molding to be formed, it is appropriate that the proportion of each of ingredients, a first polyolefin, a polyamide, first carbon fibers and a compatibilizer, in the first resin composition be within a range as specified below.

It is appropriate that the polyolefin content of the first resin composition account for e.g. from 5 mass % to 95 mass % (preferably from 10 mass % to 95 mass %, more preferably from 20 mass % to 95 mass %) of the total mass of the first resin composition.

It is appropriate that the polyamide content of the first resin composition be from 0.1 parts by mass to 100 parts by mass (preferably from 0.5 parts by mass to 90 parts by mass, more preferably from 1 part by mass to 80 parts by mass) with respect to 100 parts by mass of the polyolefin.

It is appropriate that the first carbon fiber content of the first resin composition be from 0.1 parts by mass to 200 parts by mass (preferably from 1 part by mass to 180 parts by mass, more preferably from 5 parts by mass to 150 parts by mass) with respect to 100 parts by mass of the polyolefin.

It is appropriate that the compatibilizer content of the first resin composition be from 0.1 parts by mass to 50 parts by mass (preferably from 0.1 parts by mass to 40 parts by mass, more preferably from 0.1 parts by mass to 30 parts by mass) with respect to 100 parts by mass of the polyolefin.

Further, it is appropriate in point of improvement in impact resistance of a resin molding to be formed that the proportion of each of ingredients, a second polyolefin and second carbon fibers, in the second resin composition be within a range as specified below.

It is appropriate that the polyolefin content of the second resin composition account for e.g. from 40 mass % to 90 mass % (preferably from 50 mass % to 80 mass %) of the total mass of the second resin composition.

It is appropriate that the second carbon fiber content of the second resin composition be from 11 parts by mass to 150 parts by mass (preferably from 25 parts by mass to 100 parts by mass) with respect to 100 parts by mass of the polyolefin.

In point of improvement in impact resistance, it is appropriate that the ratio (by mass) between the carbon fibers in the first resin composition and the organic fibers in the second resin composition fall within the range as specified below.

When the carbon fiber content and the organic fiber content, referred to the whole quantity of the resin composition for a resin molding, are symbolized by CF1 and OF2, respectively, it is appropriate that the ratio by mass between CF1 and OF2 (CF1/OF2 ratio) be from at least CF1/OF2=60/40 to at most CF1/OF2=99/1 (preferably from at least 70/30 to at most 95/5). Additionally, when the organic fiber content becomes higher, the bending elasticity modulus is more likely to deteriorate.

(Manufacturing Method of Resin Composition)

The first resin composition is manufactured by a method in which a first polyolefin, a polyamide, carbon fibers cut down to an intended length and a compatibilizer are subjected to melt kneading.

Herein, publicly-known systems can be used as melt kneading instruments, with examples including a twin-screw extruder, a Henschel mixer, a Banbury mixer, a single-screw extruder, a multi-screw extruder and a co-kneader.

The temperature during the melt kneading (cylinder temperature) may be determined in response to the melting temperatures of resinous ingredients and the like included in the resin composition.

It is preferred that the first resin composition in particular be obtained by a manufacturing method including the process of subjecting a polyolefin, a polyamide, carbon fibers cut down to an intended length and a compatibilizer to melt kneading. When a set of polyolefin, polyamide and carbon fibers cut down to the intended length and compatibilizer is melt-kneaded as a single unit, a covering layer of the polyamide in a thin and nearly uniform state tends to be formed around the periphery of each individual carbon fiber, thereby allowing improvements in mechanical strengths, notably in bending elasticity modulus.

As an example of a method for manufacturing the second resin composition, mention may be made of a method in which a second polyolefin and long-length organic fibers cut down to an intended length are subjected to melt kneading. As another example, mention may be made of a method in which, while the organic fibers in continuous fiber form (known as roving) are subjected to opening, the surfaces thereof are impregnated and coated with a molten polyolefin resin, and the thus processed carbon fibers are pulled out (a pultrusion process). From the viewpoint of inhibiting breakage of the organic fibers, it is preferred that the second resin composition in particular be manufactured through the use of such a pultrusion process.

As an example of a pultrusion process, mention may be made of a publicly-known method. To be more specific, in such a method, carbon fibers in continuous fiber form are impregnated and coated with a molten polyolefin by means of e.g. a cross-head die. After solidification by cooling, the resulting carbon fibers are cut down to an intended length, and thereby made into the second resin composition.

By using any of the foregoing methods is obtained a resin composition which relates to an embodiment of the invention and includes the first resin composition and the second resin composition. By the way, the resin composition relating to an embodiment of the invention may be a composition obtained by mixing the first resin composition and the second resin composition, or it may also be a composition obtained by mixing the first resin composition and the second resin composition, and then melting both the first resin composition and the second resin composition.

(Constitution of Resin Composition)

In the next place, proportions of individual ingredient contents in the whole quantity of the resin composition are described.

The resin composition relating to this embodiment of the invention has, as mentioned above, ingredient contents in their respective proportions specified below in the whole quantity of the resin composition including the first resin composition and the second resin composition.

With respect to 100 parts by mass of total content of the first polyolefin and the second polyolefin, the polyamide content is from 1 part by mass to 50 parts by mass, the carbon fiber content is from 1 part by mass to 50 parts by mass, the organic fibers is from 1 part by mass to 20 parts by mass and the compatibilizer content is from 1 part to 10 parts by mass.

The percentage of a polyolefin content (total for a first polyolefin content and a second polyolefin content) to the whole mass of resin composition may be determined in response to uses of a resulting resin molding. For example, the polyolefin content accounts for preferably 5 mass % to 95 mass %, more preferably 10 mass % to 95 mass %, still more preferably 20 mass % to 95 mass %, of the total mass of resin composition.

The carbon fiber content is from 1 part by mass to 50 parts by mass, preferably from 10 parts by mass to 50 parts by mass, more preferably from 20 parts by mass to 40 parts by mass, referred to 100 parts by mass of polyolefin.

By containing carbon fibers in a proportion of at least 1 part by mass, referred to 100 parts by mass of polyolefin, the resin composition aims reinforcement, and by adjusting the carbon fiber content to 50 parts by mass or below, referred to 100 parts by mass of polyolefin, good moldability is achieved at the time of producing a resin molding.

Hereafter, a content (by mass) with respect to 100 parts by mass of polyolefin is abbreviated as phr (per hundred resin) in some cases.

Using this abbreviation, the above phrase is expressed as "carbon fiber content is from 1 phr to 50 phr".

The organic fiber content is from 1 part by mass to 20 parts by mass, preferably from 2 parts by mass to 15 parts by mass, more preferably from 5 parts by mass to 15 parts by mass, referred to 100 parts by mass of polyolefin.

By containing organic fibers in a proportion of at least 1 part by mass, referred to 100 parts by mass of polyolefin, the resin composition aims reinforcement and can achieve improvement in impact resistance, and by adjusting the organic fiber content to 20 parts by mass or below, referred to 100 parts by mass of polyolefin, good moldability is achieved at the time of producing a resin molding.

By the way, in the case of using a fibrous reinforcing agent other than carbon fibers and organic fibers, it is appropriate that the total for a carbon fiber content and an organic fiber content account for at least 90% by mass of the total for the carbon fiber content, the organic fiber content and the fibrous reinforcing agent content.

The polyamide content is from 1 part by mass to 50 parts by mass, refereed to 100 parts by mass of polyolefin. From the viewpoint of further enhancing impact resistance, the polyamide content is preferably from 2 parts by mass to 40 part by mass, more preferably from 5 parts by mass to 30 parts by mass.

By adjusting the polyamide content to fall within the above range, the affinity for the carbon fibers is increased, and enhancement of impact resistance is aimed at.

In the special case of containing a polyamide in a large amount ranging from larger than 1 parts by mass to no larger than 50 parts by mass with respect to 100 parts by mass of polyolefin, the compatibilizer content relative to the polyamide content becomes low, and thereby it becomes difficult for the polyamide to diffuse into the polyolefin matrix and a tendency for the polyamide to localize around the peripheries of carbon fibers is intensified. Thus it is thought that a covering layer of polyamide is formed in a somewhat-thickened and nearly-uniform state all over the peripheries of the carbon fibers having short fiber lengths. Therefore adhesion at the interfaces between polyolefin and carbon fibers is enhanced, and it becomes easy to obtain a resin molding superior in mechanical strengths, notably in impact resistance.

From the viewpoint of allowing an affinity of polyamide for carbon fibers to manifest itself effectively and increasing flowability of the resin composition, it is preferred that the polyamide content be proportioned to the foregoing carbon fiber content.

The compatibilizer content is from 1 part by mass to 10 parts by mass, preferably from 1 part by mass to 8 parts by mass, more preferably from 1 part by mass to 5 parts by mass, with respect to 100 parts by mass of polyolefin.

By adjusting the compatibilizer content to fall within the above range, the affinity between polyolefin and polyamide is enhanced, and thereby improvement in impact resistance is aimed at.

From the viewpoint of enhancing the affinity between polyolefin and polyamide, it is preferred that the compatibilizer content be proportioned to the polyamide content (and be proportioned indirectly to the carbon filter content).

Each of ingredients in the resin composition relating to an embodiment of the invention is described below in detail.

—Polyolefin—

The resin composition which relates to an embodiment of the invention and is used for resin moldings contains a first polyolefin in the first resin composition and a second polyolefin in the second resin composition.

The first polyolefin and the second polyolefin may be the same as or different from each other, but they are preferably the same. In addition, as each of polyolefin for the first polyolefin and that for the second polyolefin, only one kind may be used or two or more kinds of polyolefin may be used in combination.

Hereafter, as to particulars common to the first polyolefin and the second polyolefin, explanation is made by simply using the term polyolefin so long as there is no need to make a distinction between them.

Polyolefin is a matrix of the resin composition, and refers to the resinous ingredient to be reinforced by carbon fibers (which is also referred to as a matrix resin).

Polyolefin is a resin containing repeating units of olefin origin, and the resin may contain repeating units derived from a monomer other than olefins so long as the other repeating units constitute at most 30 mass % of the whole resin.

Polyolefin is produced by addition polymerization of an olefin (and, if necessary, a monomer other than olefins).

In addition, each of the olefin and the monomer other than olefins for use in production of polyolefin may be only one kind or a combination of two or more kinds.

By the way, the polyolefin may be either a homopolymer or a copolymer. Additionally, the polyolefin may have the form of either a straight chain or a branched chain.

Examples of such olefins include straight-chain or branched-chain aliphatic olefins and alicyclic olefins.

Examples of aliphatic olefins include cc-olefins, such as ethylene, propylene, 1-butene, 1-hexene, 4-methyl-1-pentene, 1-octene, 1-decene, 1-hexadecene and 1-octadecene.

On the other hands, examples of alicyclic olefins include cyclopentene, cyclobutene, cycloheptene, norbornene, 5-methyl-2-norbornene, tetracyclododecene and vinylcyclohexene.

Of these olefins, in point of cost, α-olefins are preferable to the others, ethylene and propylene are far preferred, and propylene is especially preferred.

Also, well-known addition-polymerizable compounds are selected as a monomer other than olefins.

Examples of the addition-polymerizable compound include styrene compounds, such as styrene, methylstyrene, α-methylstyrene, β-methylstyrene, t-butylstyrene, chlorostyrene, chloromethylstyrene, methoxystyrene and styrene sulfonic acid or salts thereof; (meth)acrylic esters, such as alkyl (meth)acrylates, benzyl (meth)acrylate and dimethylaminoethyl (meth)acrylate; halovinyl compounds, such as vinyl chloride; vinyl esters such as vinyl acetate and vinyl propionate; vinyl ethers, such as vinyl methyl ether; halogenated vinylidene compounds, such as vinylidene chloride; and N-vinyl compounds, such as N-vinylpyrrolidone.

Examples of a suitable polyolefin include polypropylene (PP), polyethylene (PE) and ethylene-vinyl acetate copolymer resin (EVA). It is appropriate that the polyolefin be at least one kind selected from the group consisting of polypropylene (PP), polyethylene (PE) and ethylene-vinyl acetate copolymer resin (EVA).

Among the olefin polymers recited above, resins each containing only repeating units of olefin origin are preferred over the others, and polypropylene is especially preferred in point of cost.

The molecular weight of polyolefin is not particularly limited, and it may be determined in response to the kind of resin used, molding conditions, uses of resulting resin moldings and so on. For example, the weight-average molecular weight (Mw) of polyolefin is preferably in a range of 10,000 to 300,000, more preferably in a range of 10,000 to 200,000.

In addition, the glass transition temperature (Tg) or melting temperature (Tm) of polyolefin is not particularly limited as is the case with the molecular weight, and it may be determined in response to the kind of resin used, molding conditions, uses of resulting resin moldings and so on. For example, the melting temperature (Tm) of polyolefin is preferably in a range of 100° C. to 300° C., more preferably in a range of 150° C. to 250° C., still more preferably in a range of 150° to 200° C., most preferably in a range of 160° C. to 190° C.

By the way, the weight-average molecular weight (Mw) and melting temperature (Tm) of polyolefin are values determined as follows.

Specifically, the weight-average molecular weight (Mw) of polyolefin is determined by using gel permeation chromatography (GPC) under the following conditions. A high-temperature GPC system HLC-8321GPC/HT is used as GPC apparatus and o-dichlorobenzene is used as an eluent. A polyolefin is once molten in o-dichlorobenzene and filtered at a high temperature (a temperature in a range of 140° C. to 150° C.), and the filtrate thus obtained is adopted as a measurement sample. As to the measurement conditions, the sample concentration is 0.5%, the flow rate is 0.6 ml/min, the injected sample volume is 10 μl, and the measurement is made with an RI detector. In addition, the calibration curve is prepared using 10 polystyrene standard samples produced by TOSOH CORPORATION, TSK standard A-500, F-1, F-10, F-80, F-380, A-2500, F-4, F-40, F-128 and F-700.

On the other hand, the melting temperature (Tm) of polyolefin is determined from the DSC curve obtained by differential scanning calorimetry (DSC) as "melting peak temperature" described in JIS K 7121-1987, directions for determination of melting temperature in "methods for measuring transition temperature of plastic".

—Carbon Fiber—

The resin composition relating to an embodiment of the invention contains carbon fibers having an average fiber length of 0.1 mm to 1 mm in the first resin composition.

The average fiber length of carbon fibers is preferably from 0.1 mm to 0.8 mm, more preferably from 0.2 mm to 0.8 mm.

A method for measuring fiber lengths of the carbon fibers will be described later.

As the carbon fibers used when the first resin composition is prepared, carbon fibers having an average fiber length of e.g. 0.1 mm to 5.0 mm are suitable. For example, carbon fibers having an average fiber length of 0.1 mm to 1 mm may be used, or those having an average fiber lengths of 1 mm to 5 mm may be used. Even when carbon fibers have an average fiber length of 1 mm to 5 mm, they may be used if only the average fiber length is adjusted to fall within the range of 0.1 mm to 1 mm during the melt-kneading process.

When the average fiber length of carbon fibers in the first resin composition is in the above range, reduction in flowability at the time of melting the resin composition is inhibited. Further, reduction in bending elasticity modulus of a resulting resin molding is also inhibited.

As the carbon fibers, publicly-known carbon fibers are used, and any of PAN-based carbon fibers and pitch-based carbon fibers may be used.

The carbon fibers may be those having undergone publicly-known surface treatment.

Examples of surface treatment for carbon fibers include oxidizing treatment and sizing treatment.

As the carbon fibers, commercially available products may be used.

Examples of a commercially available PAN-based carbon fiber product include TORAYCA®, produced by Toray Industries, Inc., Tenax produced by Toho Tenax, and Pyrofil®, produced by Mitsubishi Chemical Corporation. In addition thereto, commercially available PAN-based carbon fiber products include products from Hexcel Corporation, those from Cytec Industries, Inc., those from DowAksa, those from Formosa Plastics Corporation, those from SGL and so on.

Examples of a commercially available pitch-based carbon fiber product include DIALEAD® produced by Mitsubishi Chemical Corporation, GRANOC produced by Nippon Graphite Fiber Co., Ltd., and KURECA produced by KUREHA CORPORATION. In addition thereto, commercially available pitch-based carbon fiber products include products from Osaka Gas Chemicals Co., Ltd., those from Cytec Industries, Inc. and so on.

By the way, only one kind of carbon fibers may be used, or two or more different kinds of carbon fibers may be used in combination.

The carbon fibers have no particular limits on their fiber diameter and so on, and the fiber diameter may be chosen according to the uses of a resulting resin molding. The average fiber diameter of carbon fibers may be e.g. from 5.0 μm to 10.0 μm (preferably from 6.0 μm to 8.0 μm).

Herein, the average fiber diameter of carbon fibers is determined in the following manner. A cross section orthogonal to the length direction of each individual carbon fiber is observed under an SEM (a scanning electron microscope) set at a magnification of 1,000, and the diameter of each individual carbon fiber is measured. This measurement is made on 100 carbon fibers, and the average of measured values is calculated and defined as the average diameter of carbon fibers.

—Organic Fibers—

The resin composition relating to this embodiment contains organic fibers having an average fiber length of 1 mm to 20 mm in the second resin composition. The average fiber length of organic fibers is preferably from 2 mm to 18 mm, more preferably from 6 mm to 15 mm.

The organic fibers included in the second resin composition has no particular restrictions so long as their average fiber length is in a range of 1 mm to 20 mm. In point of improvement in impact resistance of resulting resin moldings, it is appropriate to use organic fibers of the type which is produced by Roving method and made up of great many fibers in a converged state.

The organic fibers has no particular restriction, but from the viewpoint of incorporating them into the second resin composition and resin moldings, it is appropriate for the organic fibers to resist melting when they are heated for production of the second resin composition and resin moldings. In this respect, it is appropriate that the melting point, softening point or thermal decomposition temperature of organic fibers be higher than the melting point of polyolefin. For example, it is appropriate that the melting point, softening point and thermal decomposition temperature of organic fibers be at least 5° C. higher than the melting point of polyolefin. Such a temperature of organic fibers has no particular upper limit, but the upper limit thereof may be e.g. 200° C. or lower.

Additionally, the melting point, softening point or thermal decomposition temperature of organic fibers is measured as follows.

The melting point of organic fibers can be determined by the same method as used for melting-point measurement made on polyolefin. Specifically, the melting point of organic fibers is determined from the DSC curve obtained by differential scanning calorimetry (DSC) as "melting peak temperature" described in JIS K 7121-1987, directions for determination of melting temperature in "methods for measuring transition temperature of plastic".

The softening point of organic fibers is determined in conformance with JIS K 7206-2016, "methods for determining Vicat softening temperature (VST) of plastics-thermoplastic plastic".

The thermal decomposition temperature of organic fibers is determined from a TG curve obtained by thermogravimetric measurement (TG) conforming to JIS K 7121-1987, "methods for thermogravimetric measurement of plastic", as the temperature at which weight reduction of a sample begins.

Examples of organic fibers include fibers formed from resins termed "engineering plastics".

To be more specific, examples of organic fibers include ultrahigh molecular-weight polyethylene fibers; polycarbonate fibers, polyarylate fibers, polyoxymethylene fibers; polyester fibers, such as polybutylene terephthalate fibers, polybutylene naphthalate fibers and liquid-crystalline aromatic polyethylene terephthalate fibers; polybenzazole fibers, such as polyparaphenylene benzobisoxazole (PBO) fibers and polyparaphenylenebenzobisthiazole fibers; polyphenylene sulfide fibers; modified polyphenylene ether fibers; polyamide fibers such as nylon fibers; and aramide fibers such as poly-p-phenylene terephthalamide fibers and poly-m-phenylene isophthalamide fibers. Also, in addition to the above organic fibers, the organic fibers such as vinylon fibers and cellulose fibers are exemplified.

These organic fibers may be used alone, or two or more kinds thereof may be used in combination.

Of those organic fibers, at least one kind of organic fibers selected from the group consisting of aramide fibers, vinylon fibers and cellulose fiber are suitable, at least one kind selected from aramide fibers or vinylon fibers is preferred, and aramide fibers are much preferred.

Aramide is also described as all-aromatic polyamide, and refers to fibrous polyamide constituted of structural units containing aromatic rings in its molecular skeleton. The aramide fibers are generally obtained using as a raw material an aramide synthesized by copolymerization of diamine and dicarboxylic acid.

As aramide fibers, publically known aramide fiber are used, and more specifically, either of para-type aramide fibers (e.g. poly-p-phenylene terephthalamide fibers) and meta-type aramide fibers (e.g. poly-m-phenyleneisophthalamide fibers) can be used.

The aramide fibers may be those having undergone publicly-known surface treatment. Examples of surface treatment for aramide fibers include oxidizing treatment and sizing treatment.

The aramide fibers have no particular restrictions as to their fiber diameter, and the fiber diameter may be chosen in response to the uses of a resulting resin molding. The average fiber diameter of aramide fibers may be e.g. from 5.0 μm to 100 μm (preferably from 10 μm to 20 μm).

The average fiber diameter of aramide fibers is determined as follows. A cross section orthogonal to the length direction of each individual aramide fiber is observed under an SEM (a scanning electron microscope) set at a magnification of 1,000, and the diameter of each individual aramide fiber is measured. This measurement is made on 100 aramide fibers, and the average of measured values is calculated and defined as the average diameter of aramide fibers.

Vinylon fibers are e.g. fibers obtained using polyvinyl alcohol as a raw material.

As the vinylon fibers, publicly-known vinylon fibers are used. The vinylon fibers may be those having undergone surface treatment.

As the cellulose fibers, publicly-known cellulose fibers are used, with examples including fibers obtained using as a raw material natural cellulose fibers such as cotton or jute.

Fiber diameters of vinylon fibers and cellulose fibers have no particular limits, and they may be chosen in response to e.g. uses of resulting resin moldings.

Now, there are provided explanation of a method for measuring the fiber lengths of carbon fibers and organic fibers included in a resin composition and the fiber lengths of carbon fibers and organic fibers included in a resin molding as described later.

To begin with, a subject for measurement, namely a resin composition or a resin molding, is put in an aluminum crucible, and fired at 500° C. for 2 hours by means of a Muffle furnace. After the firing, the carbon fibers remaining in the crucible are collected, and dispersed into a 0.1% water solution of surfactant. Photographs of the carbon fibers are taken using a digital microscope (VHX-100, made by KEYENCE CORPORATION) under a measurement magnification of 10. The fiber lengths of carbon fibers are measured using image analysis software (WINROOF2015, produced by MITANI CORPORATION). And this fiber-length measurement is made on 200 carbon fibers, and the average value of fiber lengths thus measured is defined as an average fiber length of carbon fibers. By the way, the fiber length of carbon fibers is a number-average fiber length.

By the way, there may be cases where, depending on organic fibers included in the resin composition or the resin molding as a subject for measurement, melting or disappearance of the organic fibers occurs when the subject for measurement is fired at 500° C. for 2 hours, and thereby average fiber-length measurement becomes difficult. In such cases, average fiber-length measurement on organic fibers can be made as follows.

A resin composition or a resin molding is dissolved in an organic polar solvent such as N-methyl-2-pyrrolidone and heated under reflux for 72 hours, and thereby the polyamide as a resinous ingredient in the resin composition or the resin molding is brought into at least either a dissolved or swollen state. Organic fibers are removed from organic fiber-bearing residue, and organic fiber lengths are measured according to the measurement method mentioned above.

—Polyamide—

Polyamide is a resin having amide bonds. The polyamide include a resin having amide bonds in one and the same main chain thereof and a resin having imide bonds as well as amide bonds in one and the same main chain thereof.

Such polyamide is illustrated below in detail.

The polyamide is preferably a resin low in compatibility with polyolefin, and more specifically, a resin different in solubility parameter (SP value) from polyolefin.

Herein, the SP value difference between polyolefin and polyamide is preferably at least 3, more preferably from 3 to 6, from the viewpoints of compatibility between these polymers and repulsive force between both.

The SP value mentioned herein is a value estimated by the Fedors method. More specifically, the solubility parameter (SP value) conforms e.g. to the description in Polymer. Eng. Sci., vol. 14, p. 147 (1974), and it is determined by the following expression.

$$SP \text{ value} = \sqrt{(Ev/v)} = \sqrt{(\Sigma\Delta ei/\Sigma\Delta vi)} \qquad \text{Expression:}$$

(In the expression, Ev is evaporation energy (cal/mol), v is molar volume (cm$^3$/mol), $\Delta ei$ is evaporation energy of each individual atom or atomic group and $\Delta vi$ is molar volume of each individual atom or atomic group).

By the way, (cal/cm$^3$)$^{1/2}$ is adopted as a unit of solubility parameter (SP value), but herein the unit is omitted according to established practice and dimensionless notation is used.

In addition, the polyamide has amide bonds in its molecule.

By virtue of presence of amide bonds in polyamide, an affinity develops between the polyamide and polar groups present on the surface of carbon fiber.

As one among concrete kinds of the polyamide, there is a thermoplastic resin containing amide bonds in its main chain, and examples thereof include polyamide (PA), polyamide imide (PAI) and polyamino acid.

The polyamide has no particular restrictions, but from the viewpoints of further enhancement of impact resistance and excellent adhesion to carbon fibers, polyamide (PA) is preferred.

Examples of the polyamide include polyamide produced by copolycondensation of dicarboxylic acid and diamine and polyamide produced by condensation of lactam. More specifically, the polyamide is e.g. a polyamide having at least either structural units formed by polycondensation of dicarboxylic acid and diamine or structural units formed by ring-opening of lactam.

When polyamide having aromatic ring-containing structural units except aramide structural units and aromatic ring-free structural units is utilized as the polyamide, the polyamide can have good affinities for both of carbon fiber and polyolefin. Now, polyamide having only aromatic ring-containing structural units tends to be high in affinity for carbon fiber and low in affinity for polyolefin as compared with polyamide having only aromatic ring-free structural units. Polyamide having only aromatic ring-free structural units tends to be low in affinity for carbon fiber and high in affinity for polyolefin as compared with polyamide containing only aromatic ring-containing structural units. On this account, utilization of polyamide having both of these structural units ensures good affinities for both carbon fiber and polyolefin, and a covering layer formed of such a polyamide allows further enhancement of adhesion at the interface between carbon fiber and polyolefin. Therefore resin moldings superior in mechanical strengths, notably in impact resistance, become easy to obtain.

In addition, utilization of polyamide having both aromatic ring-containing structural units and aromatic ring-free structural unit conduces to not only reduction in melt viscosity but also improvement in moldability (e.g. injection moldability). Accordingly, resin moldings high in outward appearance quality become easy to obtain.

On the other hand, utilization of polyamide having only aramide structural units brings about thermal degradation of polyolefin at high temperatures allowing fusion of the polyamide. Moreover, satisfactory fusion of the polyamide does not occur at temperatures causing thermal degradation of polyolefin, resulting in deterioration of moldability (e.g. injection moldability) and reductions in outward appearance quality and mechanical performance of resin moldings to be produced.

By the way, the term aromatic ring used herein is intended to include 5- or more-membered monocyclic aromatic rings (e.g. cyclopentadiene, benzene) and fused rings (e.g. naphthalene) formed by fusing together two or more 5- or more-membered monocyclic aromatic rings. The aromatic rings include heterocyclic rings (e.g. pyridine) also.

In addition, the aramide structural unit refers to the structural unit formed by polycondensation reaction between an aromatic ring-containing dicarboxylic acid and an aromatic ring-containing diamine.

The aromatic ring-containing structural unit except the aramide structural unit includes e.g. at least either of the following structural units (1) and (2).

Structural unit (1): —(—NH—Ar$^1$—NH—CO—R$^1$—CO—)— (where Ar$^1$ represents a divalent organic group which contains an aromatic ring, and R$^1$ represents a divalent organic group which is free of an aromatic ring)

Structural unit (2): —(—NH—R$^2$—NH—CO—Ar$^2$—CO—)— (where Ar$^2$ represent a divalent organic group which contains an aromatic ring, and R$^2$ represents a divalent organic group which is free of an aromatic ring)

On the other hand, the aromatic ring-free structural unit includes e.g. at least either of the following structural units (3) and (4).

Structural unit (3): —(—NH—R$^{31}$—NH—CO—R$^{32}$—CO—)— (where R$^{31}$ represent a divalent organic group which is free of an aromatic ring, and R$^{32}$ represents a divalent organic group which is free of an aromatic ring)

Structural unit (4): —(—NH—R$^4$—CO—)— (where R$^4$ represents a divalent organic group which is free of an aromatic ring)

By the way, the divalent organic groups represented by individual symbols in structural formulae (1) to (3) are organic groups derived from divalent organic groups present in dicarboxylic acids, diamines or lactams. To be more specific, the divalent organic group which contains an aromatic ring and is represented e.g. by Ar$^1$ in the structural unit (1) refers to the residue formed by removing two amino groups from diamine, and the divalent organic group which is free of an aromatic group and represented e.g. by R$^1$ in the structural unit (1) refers to the residue formed by removing two carboxyl groups from a dicarboxylic acid. Additionally, the divalent organic group which is free of an aromatic ring and represented e.g. by R$^4$ in the structural unit (4) refers to the organic group sandwiched between NH and CO groups at the time of ring-opening of a lactam.

The polyamide may include a copolymerized polyamide. Alternatively, the polyamide may be a mixed polyamide, or a combination of a copolymerized polyamide with a mixed polyamide. Among them, a mixed polyamide is preferred in point of improvements in mechanical strengths, notably in impact resistance.

The copolymerized polyamide is a copolymerized polyamide obtained by copolymerizing e.g. a polyamide having aromatic ring-containing structural units except aramide structural units and a polyamide having aromatic ring-free structural units.

The mixed polyamide is e.g. a mixed polyamide including an aromatic ring-containing polyamide and an aromatic ring-free polyamide.

In the copolymerized polyamide, a suitable ratio by mass between aromatic polyamide and aliphatic polyamide (aromatic polyamide/aliphatic polyamide) is from 20/80 to 99/1

(preferably from 50/50 to 96/4) in point of further improvement in mechanical strengths, notably in impact resistance.

In the mixed polyamide also, a suitable ratio by mass between aromatic polyamide and aliphatic polyamide (aromatic polyamide/aliphatic polyamide) is from 20/80 to 99/1 (preferably from 50/50 to 96/4) in point of further improvement in mechanical strengths, notably in impact resistance.

In the aromatic polyamide, a suitable proportion of aromatic ring-containing structural units to all the structural units is 80 mass % or above (preferably 90 mass % or above, more preferably 100 mass %).

On the other hand, in the aliphatic polyamide, a suitable proportion of aromatic ring-free structural units to all the structural units is 80 mass % or above (preferably 90 mass % or above, more preferably 100 mass %).

Examples of the aromatic polyamide include polycondensates of aromatic ring-containing dicarboxylic acids and aromatic ring-free diamines and polycondensates of aromatic ring-free dicarboxylic acids and aromatic ring-containing diamines.

Examples of the aliphatic polyamide include polycondensates of aromatic ring-free dicarboxylic acids and aromatic ring-free diamines, and ring-opened polycondensates of aromatic ring-free lactams.

Examples of the aromatic ring-containing dicarboxylic acid include phthalic acids (such as terephthalic acid and isophthalic acid) and biphenyl dicarboxylic acids.

Examples of the aromatic ring-free dicarboxylic acid include oxalic acid, adipic acid, suberic acid, sebacic acid, 1,4-cyclohexanedicarboxylic acid, malonic acid, succinic acid, glutaric acid, pimelic acid and azelaic acid.

Examples of the aromatic ring-containing diamine include p-phenylenediamine, m-phenylenediamine, m-xylylenediamine, diaminodiphenylmethane and diaminodiphenyl ether.

Examples of the aromatic ring-free diamine include ethylenediamine, pentamethylenediamine, hexamethylenediamine, nonanediamine, decamethylenediamine and 1,4-cyclohexanediamine.

Examples of the aromatic ring-free lactam include a-caprolactam, undecanelactam and lauryllactam.

By the way, as each of the dicarboxylic acids, each of the diamine or the lactam, one kind thereof may be used or two or more kinds thereof may be used in combination.

Examples of the aromatic polyamide include MXD6 (a polycondensate of adipic acid and m-xylylenediamine), nylon 6T (a polycondensate of terephthalic acid and hexamethylenediamine) and nylon 9T (a polycondensate of terephthalic acid and nonanediamine).

Examples of a commercially available aromatic polyamide product include MXD6 produced by Mitsubishi Gas Chemical Industry, Inc., Genestar®: PA6T, produced by KURARAY CO., LTD., Genestar®: PA9T, produced by KURARAY CO., LTD., and TY-502NZ: PA6T, produced by TOYOBO CO., LTD.

Examples of the aliphatic polyamide include nylon 6 (ring-opened polycondensate of ε-caprolactam), nylon 11 (ring-opened polycondensate of undecanelactam), nylon 12 (ring-opened polycondensate of lauryllactam), nylon 66 (polycondensate of adipic acid and hexamethylenediamine), nylon 610 (polycondensate of sebacic acid and hexamethylenediamine) and nylon 612 (polycondensate of caprolactum (carbon number: 6) and lauryllactam (carbon number: 12).

Examples of a commercially available aliphatic polyamide product include Zytel®: 7331J (PA6), produced by Du Pont and Zytel®: 101L (PA66), produced by Du Pont.

The proportion of aromatic rings in a polyamide (a copolymerized polyamide or a mixed polyamide) is preferably from 1 mass % to 55 mass %, more preferably from 5 mass % to 50 mass %, still more preferably from 10 mass % to 40 mass %, in point of further enhancement of mechanical strengths, notably bending elasticity modulus.

By the way, the proportion of aromatic rings in a mixed polyamide is taken as a proportion of aromatic rings in the total for aromatic polyamides and aliphatic polyamides.

The wording "the proportion of aromatic rings in a polyamide" used herein refers to the proportion of the total for monocyclic aromatic rings and fused rings produced by fusing together monocyclic aromatic rings. In calculating the proportion of aromatic rings in a polyamide, substituents attached to monocyclic aromatic rings and fused rings produced by fusing together monocyclic aromatic rings are excluded.

In other words, the proportion of aromatic rings in a polyamide is determined from calculation of the molecular weight of a structural unit produced by polycondensation of a dicarboxylic acid and a diamine or the molecular weight of a structural unit produced by ring-opening of a lactam and calculation of the proportion (mass %) of molecular weight of aromatic rings (aromatic rings after removing substituents therefrom in the case of having substituents) present in such a structural unit to the molecular weight of the structural unit containing the aromatic rings.

Then, proportions of aromatic rings in representative polyamides are given below. The proportions of aromatic rings in nylon 6 and nylon 66 which have no aromatic rings are both 0 mass %. On the other hand, in the case of MXD6 having aromatic rings, the proportion of aromatic rings is 30.9 mass % because it has an aromatic ring $—C_6H_4—$ (molecular weight: 76.10) in each individual structural unit. Likewise, in the case of nylon 9T, the proportion of aromatic rings is 26.4 mass %.

Nylon 6: Structural unit with formula [$—NH—(CH_2)_5—CO—$], molecular weight of structural unit=113.16, proportion of aromatic rings=0 mass %

Nylon 66: Structural unit with formula [$—NH—(CH_2)_6—NH—CO—(CH_2)_4—CO—$], molecular weight of structural unit=226.32, proportion of aromatic rings=0 mass %

MXD6: Structural unit with formula [$—NH—CH_2—C_6H_4—NH—CO—(CH_2)_4—CO—$], molecular weight of structural unit=246.34, proportion of aromatic rings=30.9 mass %

Nylon 9T: Structural unit with formula [$—NH—(CH_2)_9—NH—CO—C_6H_4—CO—$], molecular weight of structural unit=288.43, proportion of aromatic rings=26.4 mass %

And the proportions of aromatic rings in a copolymerized polyamide and a mixed polyamide are determined as follows.

Case 1: Copolymerized polyamide or mixed polyamide of nylon 6 and MXD6 (nylon 6/MXD6 ratio by mass=50/50)—

Proportion of aromatic rings=(proportion of nylon 6×proportion of aromatic rings in nylon 6)+(proportion of MXD6×proportion of aromatic rings in MXD6)=(0.5×0)+(0.5×30.9)=15.5 (mass %)

Case 2: Copolymerized polyamide or mixed polyamide of nylon 66, MXD6 and nylon 9T (nylon 66/MXD6/nylon 9T ratio by mass=50/25/25)—

Proportion of aromatic rings=(proportion of nylon 66×proportion of aromatic rings in nylon 66)+(proportion of MXD6×proportion of aromatic rings in MXD6)+(proportion of nylon 9T×proportion of aromatic rings in nylon 9T =(0.5×0)+(0.25×30.9)+(0.25×26.4)=14.35 (mass %)

Physical properties of polyamide are explained below.

The molecular weight of polyamide is not particularly limited so long as it allows easier hot-melt of the polyamide than hot-melt of polyolefin present together in the resin composition. For example, it is appropriate that the weight-average molecular weight of polyamide be from 10,000 to 300,000, preferably from 10,000 to 100,000.

In addition, the glass transition temperature or melting temperature (melting point) of polyamide is not particularly limited as is the case with the molecular weight so long as it allows easier hot-melt of the polyamide than hot-melt of polyolefin present together in the resin composition. For example, it is appropriate that the melting temperature (Tm) of each polyamide be in a range of 100° C. to 400° C., preferably in a range of 150° C. to 350° C.

By the way, the melting temperature (Tm) of polyamide is determined by the same method as adopted in the foregoing melting temperature measurement made on polyolefin. To be more specific, the melting temperature (Tm) of polyamide is determined from the DSC curve obtained by differential scanning calorimetry (DSC) as "melting peak temperature" described in JIS K 7121-1987, directions for determination of melting temperature in "methods for measuring transition temperature of plastic".

—Carboxylic Anhydride-Modified Polyolefin Compatibilizer—

The compatibilizer is a resin allowing enhancement of an affinity between polyolefin and polyamide.

The compatibilizer may be chosen in response to the polyolefin used together.

As the compatibilizer, it is appropriate to use carboxylic anhydride-modified polyolefin which has the same structure as the polyolefin used together and contains, in portions of its molecule, moieties having an affinity for polyamide.

The carboxylic anhydride-modified polyolefin is a modified polyolefin having portions into which moieties containing carboxylic anhydride residues are introduced.

For example, when the polyolefin is polypropylene (PP), the modified polyolefin is preferably a modified polypropylene (PP), while when the polyolefin is an ethylene-vinyl acetate copolymer resin (EVA), the modified polyolefin is preferably a modified ethylene-vinyl acetate copolymer resin (EVA).

As the modifying moiety which contains a carboxylic anhydride residue and is introduced into a polyolefin, a maleic anhydride residue in particular is suitable in point of further enhancement of an affinity between polyolefin and polyamide, and besides in point of the upper limit of temperature during the molding process.

As a method for producing a modified polyolefin, there are e.g. a method of directly forming chemical bonds by making the foregoing compound having a modifying moiety react with a polyolefin, and a method of forming graft chains by the use of the foregoing compound having a modifying moiety, then making the graft chains combine with a polyolefin.

Examples of the foregoing compound containing a modifying moiety include maleic anhydride and citric anhydride and derivatives of these anhydrides.

Of the above compatibilizers, a maleic anhydride-modified polyolefin produced by making maleic anhydride as an unsaturated carboxylic acid react with a polyolefin is preferred over the others.

Examples of a modified polyolefin include maleic anhydride-modified polypropylene, maleic anhydride-modified polyethylene, maleic anhydride-modified ethylene-vinyl acetate copolymer resin (EVA), and an acid-modified polyolefin such as an addition product or copolymer of those recited above. When the polyolefin is polypropylene, maleic anhydride-modified polypropylene is especially preferred.

As the modified polyolefin, commercially available products may be used.

Examples of a commercially available modified polypropylene include UMEX® series (e.g. 100TS, 110TX, 1001, 1010) produced by Sanyo Chemical Industries, Ltd.

Examples of a commercially available modified polyethylene include UMEX® series (e.g. 2000) produced by Sanyo Chemical Industries, Ltd., and a MODIC® series produced by Mitsubishi Chemical Corporation.

Examples of a commercially available modified ethylene-vinyl acetate copolymer resin (EVA) include a MODIC® series produced by Mitsubishi Chemical Corporation.

By the way, the molecular weight of a compatibilizer has no particular limits, but in melt-fabricable point of view, it is preferably in a range of 5,000 to 100,000, more preferably in a range of 5,000 to 80,000.

—Other Ingredients—

The resin composition relating to an embodiment of the invention may further contain ingredients other than those mentioned above.

Examples of other ingredients include well-known additives such as a flame retardant, a flame retarding assistant, an agent for inhibiting drips during heating (a drip inhibitor), a plasticizer, an antioxidant, a release agent, a lightfastness agent, a weatherproof agent, a coloring agent, pigments, a modifier, an antistatic agent, a hydrolysis inhibitor, a filler and a reinforcing agent other than carbon fibers (e.g. talc, clay, mica, glass flakes, milled glass, glass beads, crystalline silica, alumina, silicon nitride, aluminum nitride, boron nitride or so on).

In addition to carbon fibers, other fibrous reinforcing materials may be incorporated.

The other fibrous reinforcing materials have no particular restrictions so long as they are fibrous in form. Examples of a fibrous reinforcing material include continuous or discontinuous reinforced fibers such as glass fiber, aramide fiber, silicon carbide fiber, alumina fiber, boron fiber, tungsten carbide fiber and organic fibers (e.g. aramide, vinylon, nylon and cellulose fibers). Where fiber-reinforced fillers are concerned also, only one kind thereof may be added, or two or more kinds thereof may be added in combination.

The size of a fibrous reinforcing material has no particular limits. It is appropriate for the fibrous reinforcing material to have e.g. a number-average fiber length in a range of 20 μm to 40 mm, preferably in a range of 30 μm to 30 mm. In addition, it is appropriate for the fibrous reinforcing material to have a number-average fiber diameter in a range of 1 μm to 30 μm, preferably in a range of 1 μm to 20 μm. By the way, it is adequate that a reinforcing material in a raw material state before undergoing melt-kneading with a thermoplastic resin or the like meets requirements that its number-average fiber length and its number-average fiber diameter be in the respective ranges specified above, and it is preferred that the reinforcing material meet such requirements even after undergoing melt-kneading.

It is appropriate for the foregoing other ingredients to be added e.g. in an amount of 0 parts by mass to 10 parts by mass, preferably in an amount of 0 parts by mass to 5 parts by mass, with respect to 100 parts by mass of polyolefin. The expression "0 parts by mass" herein means a state that no other ingredients are incorporated.

<Resin Molding>

A resin molding relating to an embodiment of the invention contains a polyolefin, a polyamide, carbon fibers and a compatibilizer. In other words, the resin molding relating to an embodiment of the invention is constituted of the same ingredients that constitute the resin composition relating to an embodiment of the invention.

More specifically, the present resin molding contains, with respect to 100 parts by mass of a polyolefin, 1 part by mass to 50 parts by mass of a polyamide, 1 part by mass to 50 parts by mass of carbon fibers having an average fiber length of 0.2 mm to 1 mm and including carbon fibers having their fiber lengths in a range of 1 mm to 20 mm in a proportion of 1% to 20% by number to all the carbon fibers, and 1 part by mass to 10 parts by mass of a carboxylic anhydride-modified polyolefin as a compatibilizer.

In other words, the resin molding contains a polyolefin, and further contains, per 100 parts by mass of polyolefin, a polyamide in a content of 1 part by mass to 50 parts by mass, carbon fibers in a content of 1 part by mass to 50 parts by mass and a compatibilizer in a content of 1 part by mass to 10 parts by mass.

And the carbon fibers have an average fiber length in a range of 0.2 mm to 1 mm, and the percentage by number of the carbon fibers from 1 mm to 20 mm in fiber length to all the carbon fibers is from 1% to 20%.

In addition, the percentage by number of the carbon fibers from 1 mm to 20 mm in fiber length to all the carbon fibers is preferably from 5% to 20% from the viewpoint of enhancing impact resistance.

By the way, it is appropriate for the resin molding relating to an embodiment of the invention to be a non-crosslinked resin molding.

The resin molding relating to an embodiment of the invention may be one which is obtained by preparing a resin composition relating to an embodiment of the invention, and then molding this resin composition. In producing a resin molding relating to an embodiment of the invention by molding a resin composition relating to an embodiment of the invention, the carbon fibers included in the resin molding are in a mixed state of first carbon fibers and second carbon fibers.

Herein, the carbon fiber content represents the whole quantity of carbon fibers included in the resin molding, and the average fiber length of carbon fibers represents an average fiber length of all the carbon fibers included in the resin molding. In addition, the proportion by number of carbon fibers having their fiber lengths in a range of 1 mm to 20 mm is expressed in terms of the percentage by number to all the carbon fibers included in the resin molding.

The method for measuring an average length of fibers included in the molding is as described already. In addition, the proportion by number of carbon fibers having their fiber lengths in a range of 1 mm to 20 mm is determined by performing image analysis according to the method described already and checking for the number of carbon fibers having their fiber lengths in a range of 1 mm to 20 mm among all the carbon fibers on which average fiber-length measurement have been made.

Examples of a method applicable to forming of a resin molding relating to an embodiment of the invention include injection molding, extrusion molding, blow molding, hot press molding, calender molding, coating molding, cast molding, dipping molding, vacuum molding and transfer molding.

The method for forming the resin molding relating to an embodiment of the invention is preferably injection molding in point of high degree of freedom in shaping.

The cylinder temperature in injection molding is e.g. from 180° C. to 300° C., preferably from 200° C. to 280° C. The mold temperature in injection molding is e.g. from 30° C. to 100° C., preferably from 30° C. to 60° C.

The injection molding may be carried out using a commercially available machine, such as NEX150 made by NISSEI PLASTIC INDUSTRIAL CO., LTD., NEX300 made by NISSEI PLASTIC INDUSTRIAL CO., LTD., or SE50D made by Sumitomo Heavy Industries, Ltd.

The resin molding relating to an embodiment of the invention are used suitably for application to electrical-electronic instruments, office instruments, household electric appliances, car's interior materials, containers or so on. More specifically, they are used for cabinets of electrical-electronic instruments and household electric appliances, various parts of electrical-electronic instruments and household electric appliances, car's interior parts, storage cases for CD-ROM, DVD and the like, tableware, beverage bottles, food trays, wrapping materials, film, tarpaulin and so on.

The resin molding relating to an embodiment of the invention in particular is a resin molding superior in mechanical strengths, notably in bending elasticity modulus, because carbon fibers are adopted as reinforcing fibers, and hence it is used suitably as substitutes for metallic parts.

EXAMPLES

The invention will now be illustrated in more detail by reference to the following examples, but these examples should not be construed as limiting the invention in any way.

Examples 1 to 13 and Comparative Examples 1 to 11

(Preparation for Resin Composition)

Each of pellets A-1 to A-8 as the first resin compositions was prepared by kneading a set of ingredients as shown in Table 4 under kneading conditions described below and a melt-kneading temperature (cylinder temperature) as indicated in Table 1 by means of a twin-screw kneader (TEM58SS, made by TOSHIBA MACHINE CO., LTD.) incorporating a low-shear screw having a compression ratio of 1.8 and one pin-type mixing section in its screw structure.

By the way, the carbon fibers used for preparation of the pellets A-1 to A-8 were as follows.

(TORAYCA®, produced by Toray Industries, Inc., chopped carbon fibers having undergone surface treatment, average fiber length: 20 mm, average fiber diameter: 7 μm)

A pellet B-1 was prepared as a second resin composition containing long-length aramide fibers through the use of PLASTRON PP-AF-30-T3 (L6) (produced by Daicel Polymer, Ltd.).

A pellet B-2 was prepared as a second resin composition containing long-length vinylon fibers through the use of Centerfill Vinylon 30 (produced by Chuo Kaseihin Co., Inc.).

A pellet B-3 was prepared by processing the pellet B-1 under the kneading conditions mentioned above to shorten the fiber length of the aramide fibers.

Further, a resin composition B-4 was prepared by mixing 70 parts of a PP (polypropylene) pellet and 30 parts of chopped aramide fibers having a fiber length of 50 mm. Likewise, a resin composition A-9 was prepared by mixing 55 parts of a PP pellet, 20 parts of a PA6 pellet, 5 parts of a MA-PP pellet and 20 parts of 11 mm-length CF fibers.

A pellet B-5 was prepared as a second resin composition containing 20 mm-length aramide fibers through the use of PLASTRON PP-AF-30-T3 (L20) (produced by Daicel Polymer, Ltd.).

Additionally, average fiber-length measurement of carbon fibers was made on each of the pellets A-1 to A-9 and average fiber length measurement of organic fibers was made on each of the pellets B-1 to B-5 in accordance with the method described already. Results of the measurements are shown in Table 1.

(Analyses of Carbon Fibers and Organic Fibers)

The average fiber length of carbon fibers, the average fiber length of organic fibers and the percentage by number of fibers from 1 mm to 20 mm in fiber length to the total for carbon fibers and organic fibers (hereafter expressed as "percentage of fibers at least 1 mm in length") were measured according to the already-described methods, respectively.

(Moldability in Forming Resin Molding)

Moldability of each resin composition was evaluated as follows.

After forming a resin pellet from each of the compositions prepared so as to have ingredient contents according to Table 2 or Table 3, a 4 mm-thick multipurpose test piece A1 conforming to JIS K7139 was molded into a dumbbell sample by means of an injection molding machine.

—Evaluation Criteria—

A: Molding defects including unevenness, defective part and the like are not observed in all area of the molded surface, namely the molded surface is uniform.

TABLE 1

| | | Manufacturing Example No. | | | | | | | | | | | | |
|---|---|---|---|---|---|---|---|---|---|---|---|---|---|---|
| | | 1 | 2 | 3 | 4 | 5 | 6 | 7 | 8 | 9 | 10 | — | — | 11 | 12 |
| | Pellet No. | A-1 | A-2 | A-3 | A-4 | A-5 | A-6 | A-7 | A-8 | A-9 | B-1 | B-2 | B-3 | B-4 | B-5 |
| Ingredient content (parts by mass) | PP | 55 | 60 | 55 | 57 | 60 | 60 | | | 55 | 70 | 70 | 70 | 70 | 70 |
| | PE | | | | | | | 55 | | | | | | | |
| | EVA | | | | | | | | 55 | | | | | | |
| | PA6 | 30 | 15 | 10 | | | 10 | 10 | 10 | 20 | | | | | |
| | PA66 | | | | 20 | | | | | | | | | | |
| | MXD6 | | | | | 20 | 10 | | | | | | | | |
| | MA-PP | 5 | 5 | 5 | 8 | 5 | 3 | | | 5 | | | | | |
| | MA-PE | | | | | | | 5 | | | | | | | |
| | MA-EVA | | | | | | | | 5 | | | | | | |
| | Carbon fiber | 10 | 20 | 30 | 15 | 15 | 17 | 30 | 30 | 20 | | | | | |
| | Organic fiber | | | | | | | | | | 30 | 30 | 30 | 30 | 30 |
| | Total | 100 | 100 | 100 | 100 | 100 | 100 | 100 | 100 | 100 | 100 | 100 | 100 | 100 | 100 |
| | Melt-kneading temperature | 240 | 240 | 240 | 270 | 240 | 240 | 240 | 240 | — | — | — | 180 | — | — |
| | Average fiber-length of carbon fibers (mm) | 0.5 | 0.5 | 0.5 | 0.3 | 0.8 | 0.8 | 0.5 | 0.5 | 11 | — | — | — | — | — |
| | Average fiber-length of organic fibers (mm) | | | | | | | | | | 6 | 12 | 0.9 | 50 | 20 |
| Note | Polyamide content (per 100 parts of PO) | 55 | 25 | 18 | 35 | 33 | 33 | 18 | 18 | 36 | 0 | 0 | 0 | 0 | 0 |
| | Compatibilizer content (per 100 parts of PO) | 9 | 8 | 9 | 14 | 8 | 5 | 9 | 9 | 9 | 0 | 0 | 0 | 0 | 0 |
| | Carbon fiber content (per 100 parts of PO) | 18 | 33 | 55 | 26 | 25 | 28 | 55 | 55 | 36 | 0 | 0 | 0 | 0 | 0 |
| | Organic fiber content (per 100 parts of PO) | 0 | 0 | 0 | 0 | 0 | 0 | 0 | 0 | 0 | 43 | 43 | 43 | 43 | 43 |

(Injection Molding)

Each of the pellets A-1 to A-9 and each of the pellets B-1 to B-5 were mixed together according to the formula as shown in Table 2 or Table 3, and molded into an ISO multipurpose dumbbell test piece (compliant with ISO 527 tensile test and ISO 178 bending test) (test part thickness 4 mm, width 10 mm) and a D2 test piece (length 60 mm, width 60 mm, thickness 2 mm) by using an injection molding machine (NEX150, made by NISSEI PLASTIC INDUSTRIAL CO., LTD.) at a cylinder temperature as indicated in Table 5 or Table 6 and a mold temperature 50° C. under a back pressure of 10 MPa.

<Evaluations>

By using the two kinds of test pieces thus formed, the following evaluations were made. Evaluation results obtained are shown in Table 2 and Table 3.

B: Molding defects including unevenness, defective part and the like are developed in an area smaller than 20% of the molded surface.

C: Molding defects including unevenness, defective part and the like are developed in an area larger than or equal to 20% of the molded surface.

(Bending Elasticity Modulus)

Bending elasticity modulus measurements were made on each of the foregoing ISO multipurpose dumbbell test pieces by using a method conforming to ISO178 and universal testing apparatus (Autograph AG-Xplus, made by SHIMADZU CORPORATION).

(Impact Resistance)

Each of the foregoing ISO multipurpose dumbbell test pieces was subjected to notching (4 mm in plate thickness), and its Charpy impact strength (kJ/m$^2$) was measured by conforming to the method defined in ISO 179 and using an impact testing instrument (DG-5, made by Toyo Seiki Seisaku-Sho, Ltd.). The greater the measured value, the higher the impact resisting strength.

(Presence or Absence of Covering Layer)

Each of the foregoing D2 test pieces was checked up on the presence or absence of a covering layer of polyamide in accordance with the method described already.

TABLE 2

| | | | Example No. | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 | 13 |
| Mixed Pellet | Ingredient Content (parts by mass) | A-1 | 80 | | | | | | | | | | | | |
| | | A-2 | | 80 | | | | | | | | | | | |
| | | A-3 | | | 85 | | | | | | | | | | |
| | | A-4 | | | | 85 | | | | | | | | | |
| | | A-5 | | | | | 70 | | | | | | | | |
| | | A-6 | | | | | | 75 | | | | | | | |
| | | A-7 | | | | | | | 80 | | | | | | |
| | | A-8 | | | | | | | | 80 | | | | | |
| | | A-9 | | | | | | | | | 75 | | | | |
| | | B-1 | 10 | 10 | 15 | 15 | 30 | | 20 | 20 | | | | | |
| | | B-2 | | | | | | 25 | | | 25 | | | | |
| | | B-3 | | | | | | | | | | 20 | | | |
| | | B-4 | | | | | | | | | | | 10 | 10 | |
| | | B-5 | | | | | | | | | | | | | 10 |
| | Total | | 100 | 100 | 100 | 100 | 100 | 100 | 100 | 100 | 100 | 100 | 100 | 100 | 100 |
| | Carbon fiber content CF1 (parts by mass) | | 9 | 18 | 25.5 | 8.5 | 21 | 11.25 | 12 | 13.6 | 7.5 | 13.6 | 27 | 27 | 18 |
| | Organic fiber content CF2 (parts by mass) | | 3 | 3 | 4.5 | 4.5 | 9 | 7.5 | 6 | 6 | 7.5 | 6 | 3 | 3 | 3 |
| | Fiber ratio (CF1/CF2) | | 75/25 | 86/14 | 85/15 | 65/35 | 70/30 | 60/40 | 67/33 | 69/31 | 50/50 | 69/31 | 90/10 | 90/10 | 86/14 |
| Resin Molding | Ingredient Content (parts by mass) | PP | 56.5 | 81 | 57.25 | 57.35 | 59.5 | 60.25 | 62 | 62 | 58.75 | 82 | 7 | 7 | 81 |
| | | PE | | | | | | | | | | | 49.5 | 49.5 | |
| | | EVA | 27 | 13.5 | 8.5 | 25.5 | 7 | | | 5 | 22.5 | 8 | 9 | 8 | 13.5 |
| | | PA6 | | | | | | 15 | 16 | | | | | | |
| | | PA66 | | | | | | | | 8 | | 8 | | | |
| | | MXD6 | | | | | | | | | | | 4.5 | 4.6 | |
| | | MA-PP | 4.5 | 4.5 | 4.25 | 4.25 | 3.5 | 6 | 4 | 2.4 | 3.75 | 2.4 | | | 4.5 |
| | | MA-PE | | | | | | | | | | | 4.5 | | |
| | | MA-EVA | | | | | | | | | | | | | |
| | | Carbon fibers | 9 | 18 | 25.5 | 8.5 | 21 | 11.25 | 12 | 13.6 | 7.5 | 18.6 | 27 | 27 | 18 |
| | | Organic fibers | 3 | 3 | 4.5 | 4.5 | 9 | 7.5 | 8 | 8 | 7.5 | 6 | 3 | 3 | 3 |
| | Total | | 100 | 100 | 100 | 100 | 100 | 100 | 100 | 100 | 100 | 100 | 100 | 100 | 100 |
| | Molding temperature (cylinder temperature ° C.) | | 240 | 240 | 240 | 240 | 240 | 270 | 240 | 240 | 240 | 240 | 240 | 240 | 240 |
| | Average fiber length of carbon fibers (mm) | | 0.3 | 0.3 | 0.3 | 0.3 | 0.3 | 0.2 | 0.4 | 0.4 | 0.4 | 0.4 | 0.3 | 0.3 | 0.3 |
| | Average fiber length of organic fibers (mm) | | 3 | 3 | 3 | 5 | 3 | 4 | 4 | 4 | 2 | 1 | 3 | 3 | 18 |

TABLE 2-continued

|  |  | Example No. | | | | | | | | | | | | |
|---|---|---|---|---|---|---|---|---|---|---|---|---|---|
| Property | | 1 | 2 | 3 | 4 | 5 | 6 | 7 | 8 | 9 | 10 | 11 | 12 | 13 |
| | Percentage of fibers at least 1 mm in length (number %) | 16 | 10 | 4 | 18 | 6 | 8 | 12 | 10 | 3 | 2 | 4 | 4 | 12 |
| | Moldability in forming resin molding | A | A | A | A | A | A | A | A | A | A | A | A | A |
| | Bending elasticity modulus (Gpa) | 10 | 15 | 20 | 9 | 18 | 12 | 12 | 18 | 10 | 12 | 12 | 10 | 12 |
| | Charpy (kJ/m²) | 15 | 11 | 9 | 16 | 12 | 11 | 11 | 10 | 15 | 16 | 14 | 16 | 20 |
| | Presence or absence of covering layer | Presence | Presence | Presence | Presence | Presence | Presence | Presence | Presence | Presence | Presence | Presence | Presence | Presence |
| Note | Polyamide content (per 100 parts of PO) | 47.8 | 22.1 | 14.8 | 44.5 | 11.8 | 24.9 | 25.8 | 25.8 | 38.3 | 25.8 | 15.9 | 15.9 | 22.1 |
| | Compatibilizer content (per 100 parts of PO) | 8 | 7.4 | 7.4 | 7.4 | 5.9 | 10 | 6.5 | 6.9 | 8.4 | 3.9 | 8 | 8 | 7.4 |
| | Carbon fiber content (per 100 parts of PO) | 15.9 | 29.5 | 44.5 | 14.8 | 35.3 | 18.7 | 19.4 | 21.9 | 12.8 | 21.9 | 47.8 | 47.8 | 29.5 |
| | Organic fiber content (per 100 parts of PO) | 5.3 | 4.9 | 7.9 | 7.9 | 15.1 | 12.4 | 9.7 | 9.7 | 12.5 | 9.7 | 5.3 | 5.3 | 4.9 |

TABLE 3

| | | | Comparative Example No. | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Mixed pellet | Ingredient content (parts by mass) | A-1 | 100 | | | | 95 | | | | | | |
| | | A-2 | | | | 35 | | | | | 95 | 95 | |
| | | A-3 | | | 97 | | | | | | | | |
| | | A-4 | | | | | | 95 | | | | | |
| | | A-5 | | | | | | | | | | | |
| | | A-6 | | | | | | | | | | | |
| | | A-7 | | | | | | | 100 | | | | |
| | | A-8 | | | | | | | | 100 | | | |
| | | A-9 | | | | | | | | | | | 95 |
| | | B-1 | | 100 | 3 | 65 | 5 | 5 | | | | | 5 |
| | | B-2 | | | | | | | | | | | |
| | | B-3 | | | | | | | | | 5 | | |
| | | B-4 | | | | | | | | | | 5 | |
| | | B-5 | | | | | | | | | | | |
| | | Total | 100 | 100 | 100 | 100 | 100 | 100 | 100 | 100 | 100 | 100 | 100 |
| | Carbon fiber content CF1 (parts by mass) | | 10 | 0 | 29.1 | 7 | 9.5 | 14.25 | 30 | 30 | 19 | 19 | 19 |
| | Organic fiber content CF2 (parts by mass) | | 0 | 30 | 0.9 | 19.5 | 1.5 | 1.5 | 0 | 0 | 1.5 | 1.5 | 1.5 |
| | Fiber ratio (CF1/CF2) | | 100/0 | 0/100 | 97/3 | 26/74 | 86/14 | 90/10 | 100/0 | 100/0 | 93/7 | 93/7 | 93/7 |
| Resin Molding | Ingredient Content (parts by mass) | PP | 55 | 70 | 55.45 | 66.5 | 55.75 | 57.65 | | | 60.5 | 60.5 | 55.75 |
| | | PE | | | | | | | 55 | | | | |
| | | EVA | | | | | | | | 55 | | | |
| | | PA6 | 30 | | 9.7 | 5.35 | 28.5 | | 10 | 10 | 14.25 | 14.25 | 19 |
| | | PA66 | | | | | | 19 | | | | | |
| | | MXD6 | | | | | | | | | | | |
| | | MA-PP | 5 | | 4.85 | 1.75 | 4.75 | 7.6 | | | 4.75 | 4.75 | 4.75 |
| | | MA-PE | | | | | | | 5 | | | | |
| | | MA-EVA | | | | | | | | 5 | | | |
| | | Carbon fibers | 10 | | 29.1 | 7 | 9.5 | 14.25 | 30 | 30 | 19 | 19 | 19 |
| | | Organic fibers | | 30 | 0.9 | 19.5 | 1.5 | 1.5 | | | 1.5 | 1.5 | 1.5 |
| | | Total | 100 | 100 | 100 | 100 | 100 | 100 | 100 | 100 | 100 | 100 | 100 |
| | Molding temperature (Cylinder temperature °C.) | | 240 | 180 | 240 | 240 | 240 | 270 | 240 | 240 | 270 | 240 | 240 |
| | Average fiber length of carbon fibers (mm) | | 0.3 | — | 0.3 | 0.3 | 0.3 | 0.2 | 0.3 | 0.3 | 0.2 | 0.4 | 3 |
| | Average fiber length of organic fibers (mm) | | — | 6 | 3 | 3 | 4 | 4 | — | — | 0.5 | 25 | 4 |
| | Percentage of fibers at least 1 mm in length (number %) | | 0 | 100 | 3 | 30 | 4 | 4 | 0 | 0 | 0.7 | 4 | 60 |
| | Property | Moldability in forming resin molding | A | B | A | B | A | A | A | A | A | C | C |
| | | Bending elasticity modulus (Gpa) | 14 | 5 | 12 | 6 | 6 | 13 | 9 | 8 | 5 | 8 | 14 |
| | | Charpy (kJ/m$^2$) | 6 | 18 | 7 | 13 | 6 | 6 | 7 | 8 | 8 | 15 | 6 |
| | | Presence or absence of covering | Presence | Presence | Presence | Presence | Presence | Presence | Presence | Presence | Presence | Presence | Presence |
| Note | Polyamide content (per 100 parts of PO) | | 54.5 | 0 | 17.5 | 7.9 | 51.1 | 33 | 18.2 | 18.2 | 23.6 | 23.6 | 34.1 |
| | Compatibilizer content (per 100 parts of PO) | | 9.1 | 0 | 8.7 | 2.6 | 8.5 | 18.2 | 9.1 | 9.1 | 7.9 | 7.9 | 8.5 |
| | Carbon fiber content (per 100 parts of PO) | | 18.2 | 0 | 52.5 | 10.5 | 17 | 24.7 | 54.5 | 54.5 | 31.4 | 31.4 | 34.1 |
| | Organic fiber content (per 100 parts of PO) | | 0 | 42.9 | 1.6 | 29.3 | 2.7 | 2.6 | — | — | 2.5 | 2.5 | 2.7 |

The wording "content (per 100 parts of PO)" in the note column refers to a content expressed in parts by mass with respect to 100 parts by mass of polyolefin.

Details of the kinds of ingredients in Table 1 to Table 3 are as follows.

—Polyolefin—

PP: Polypropylene (NOVATEC® PPMA3, produced by Japan Polypropylene Corporation)

PE: Polyethylene (ULTZEX® 20100J, produced by Prime Polymer Co., Ltd.)

EVA: Ethylene-vinyl acetate copolymer resin (41XEV250, produced by DU PONT-MITSUI POLYCHEMICALS CO., LTD.)

—Polyamide: Aliphatic PA (Aliphatic Polyamide)—

PA6: (Nylon 6 Zytel® 7331J, produced by Du Pont, melting temperature: 225° C.)

PA66: (Nylon 66 101L, produced by Du Pont, melting temperature: 260° C.)

—Polyamide: Aromatic PA (Aromatic Polyamide)—

MXD6: (MXD6 produced by MITSUBISHI GAS CHEMICAL COMPANY, INC., melting temperature: 237° C.)

—Compatibilizer—

MA-PP: Maleic anhydride-modified polypropylene (UMEX® 110TS, produced by Sanyo Chemical Industries, Ltd.)

MA-PE: Maleic anhydride-modified polyethylene (MODIC® M142, produced by Mitsubishi Chemical Corporation)

MA-EVA: Maleic anhydride-modified ethylene-vinyl acetate copolymer resin (MODIC® A543, produced by Mitsubishi Chemical Corporation)

As can be seen from the data shown above, results of impact resisting strength evaluations made on Examples are better than those made on Comparative Examples.

In addition, by analyzing each of the moldings produced in Examples in accordance with the method described already, it has been ascertained that there was an intervening layer of the compatibilizer used (a layer of maleic anhydride-modified polypropylene, maleic anhydride-modified polyethylene or maleic anhydride-modified ethylene-vinyl acetate copolymer resin (EVA)) between the covering layer and the polyolefin (or equivalently, a layer of compatibilizer was formed on the covering layer's surface).

What is claimed is:

1. A resin composition for resin moldings, comprising:
   a first resin composition containing a first polyolefin, a polyamide, carbon fibers having an average fiber length of 0.1 mm to 1 mm and a carboxylic anhydride-modified polyolefin as a compatibilizer; and
   a second resin composition containing a second polyolefin and organic fibers having an average fiber length of 1 mm to 20 mm,
   wherein of the whole quantity of the resin composition for resin moldings, taking the total contents of the first polyolefin and the second polyolefin as 100 parts by mass, a content of the polyamide accounts for 1 part by mass to 50 parts by mass, a content of the carbon fiber accounts for 1 part by mass to 50 parts by mass, a content of the organic fibers accounts for 1 part by mass to 20 part by mass, and a content of the compatibilizer accounts for 1 part by mass to 10 parts by mass.

2. The resin composition for resin moldings according to claim 1, wherein a mass ratio CF1/OF2 is from at least 60/40 to at most 99/1, wherein CF1 represents a content of the carbon fiber with respect to the whole quantity of the resin composition for resin moldings and OF2 represents a content of the organic fiber with respect to the whole quantity of the resin composition for resin moldings.

3. The resin composition for resin moldings according to claim 1, wherein each of the first polyolefin and the second polyolefin is at least one polymer selected from the group consisting of polypropylene, polyethylene and ethylene-vinyl acetate copolymer resin.

4. The resin composition for resin moldings according to claim 1, wherein the compatibilizer is at least one selected from the group of modified polyolefins including a modified polypropylene, a modified polyethylene and a modified ethylene-vinyl acetate copolymer, the modified polyolefins each having a modified moiety containing a carboxylic anhydride residue.

5. The resin composition for resin moldings according to claim 4, wherein the carboxylic anhydride residue is a maleic anhydride residue.

6. The resin composition for resin moldings according to claim 1, wherein the organic fibers have a melting point higher than a melting point of polyolefin, a softening point higher than the melting point of polyolefin, or a thermal decomposition temperature higher than the melting point of polyolefin.

7. The resin composition for resin moldings according to claim 6, wherein the organic fibers are at least one of aramide fibers and vinylon fibers.

8. The resin composition for resin moldings according to claim 1, wherein part of the polyamide forms a covering layer around the periphery of each of the carbon fibers in the first resin composition.

9. The resin composition for resin moldings according to claim 8, wherein the compatibilizer forms an intervening layer between the covering layer and the first polyolefin in the first resin composition.

10. The resin composition for resin moldings according to claim 1, wherein each of the first resin composition and the second resin composition is a non-crosslinked resin composition.

11. The resin composition for resin moldings according to claim 1, wherein the content of the polyamide is from 11.8 parts by mass to 50 parts by mass, and the content of the compatibilizer is from 3.9 parts by mass to 10 parts by mass.

* * * * *